June 21, 1949.  A. G. BUTLER  2,473,858
METHOD AND APPARATUS FOR WELDING STRUCTURAL CAGES
Original Filed Jan. 2, 1946  3 Sheets-Sheet 1

Inventor
Adolf G. Butler
By Lyon & Lyon
Attorneys

June 21, 1949.  A. G. BUTLER  2,473,858
METHOD AND APPARATUS FOR WELDING STRUCTURAL CAGES
Original Filed Jan. 2, 1946  3 Sheets-Sheet 3
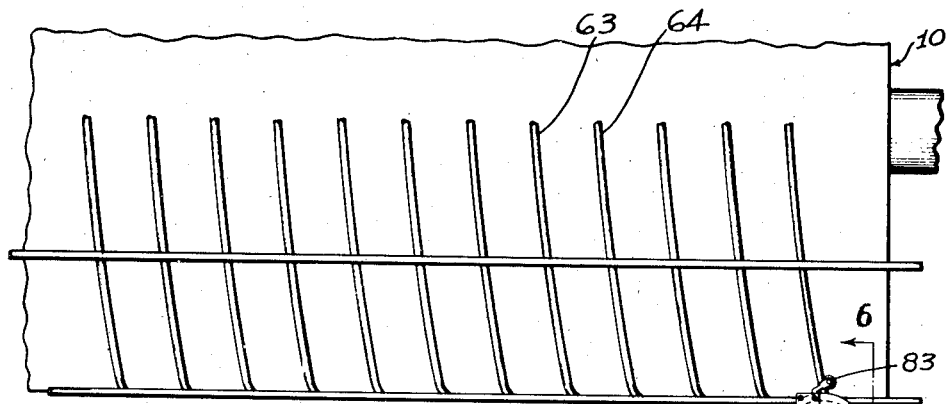
Fig. 5
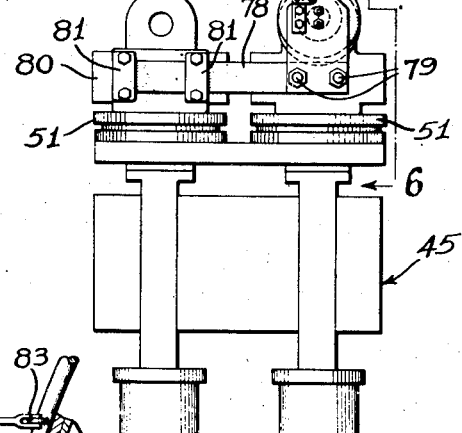
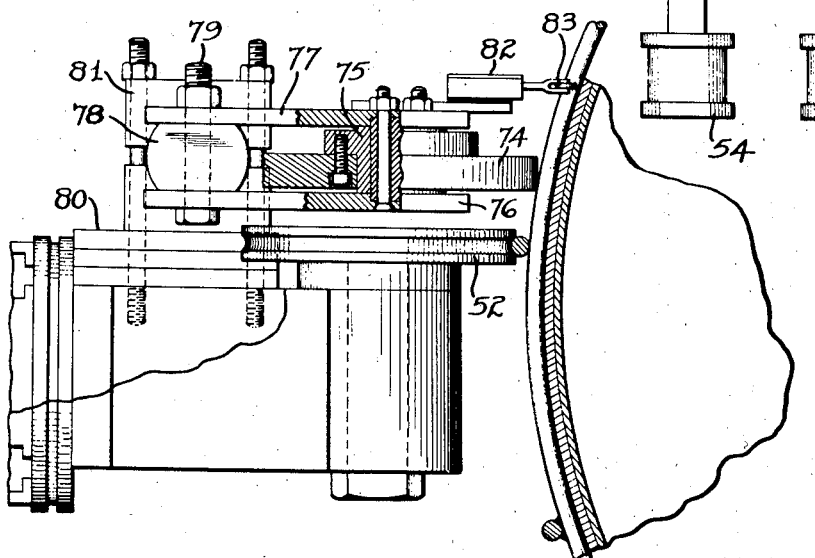
Fig. 6
Inventor
Adolf G. Butler
By Lyon & Lyon
Attorneys Patented June 21, 1949

2,473,858

UNITED STATES PATENT OFFICE 2,473,858

METHOD AND APPARATUS FOR WELDING STRUCTURAL CAGES

Adolf G. Butler, Hawthorne, Calif., assignor to American Pipe & Construction Company, Los Angeles, Calif., a corporation of Delaware Original application January 2, 1946, Serial No. 638,700. Divided and this application November 22, 1948, Serial No. 61,381

5 Claims. (Cl. 219—4)

This is a division of my copending application, filed January 2, 1946, Serial No. 638,700, entitled "Method and apparatus for welding structural cages." This invention relates to a method and apparatus for the welding of structural cages and is more particularly directed to the fabrication of structural reinforcing cages which may, for example, be used in the formation of concrete pipe, pillars or the like. Heretofore it has been the practice to form structural cages upon a supporting mandrel by the positioning of wires in rows around the mandrels and by the spiral wrapping of wire lengths around the cage and completing the formation of the cage by fusion welding of the different wires forming the cage structure at their junctions or points of crossing when thus positioned upon the mandrel. This operation is slow, wasteful of wire, and does not result in a properly formed cage for many uses as the mesh formed includes diagonal wires many times undesired in the cage structure.

In accordance with my invention, I position a helical wire on a supporting mandrel and then by resistance welding operations join longitudinal strands of wire to the internal wire helix, utilizing a flow of current between the wires as a means of performing the electric welding of the respective wires at their crossings.

It is the principal object of this invention to provide a novel method and apparatus for constructing a wire cage. Another object is to provide novel apparatus for welding longitudinal wires on the outside of a wire helix. Another object of my invention is to provide a novel method of forming wire cages for use in structural elements or in the constructing of columns or pipes wherein the wires themselves provide the electrical resistance coupling necessary to carry out the electric welding at the points of crossing of the wires forming the cage.

Another object of this invention is to provide an apparatus for the welding of wire cages which is of simple construction, rapid and continuous in operation, and which permits the formation of the cage structure without loss of wire, thereby decreasing the cost of formation of such cages.

Other objects and advantages will be apparent from the following detailed description of a preferred embodiment thereof as illustrated in the accompanying drawings.

In the drawings:

Figure 5 is a fragmental plan view of a modified form of device embodying my invention.

Figure 6 is a partial end view taken in the direction 6—6 as shown in Figure 5.

Figure 1:
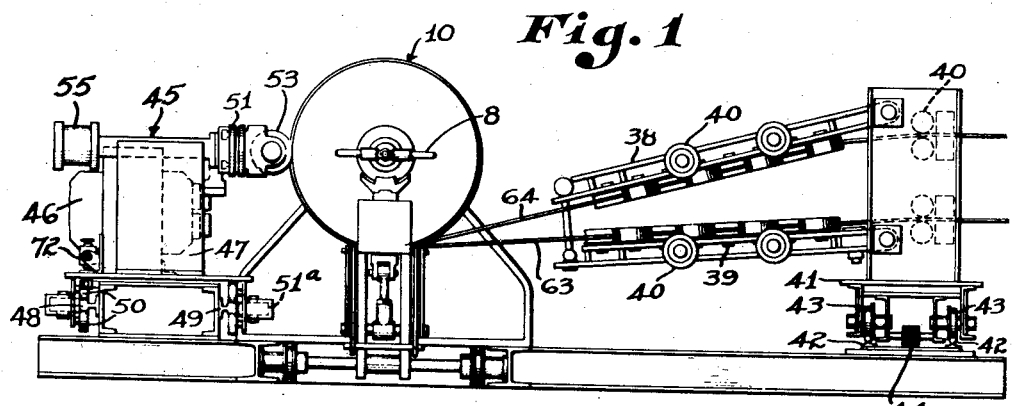
Figure 1 is an end elevation of the apparatus embodying and utilized in carrying out my invention.

In accordance with my invention, a means is provided for welding one or more wires around a plurality of longitudinal rods in order to form a cage. As shown in the drawings, a mandrel 10 may be provided and supported for rotation on axially spaced bearings 11 and 12. The mandrel 10 preferably comprises a number of arcuate segments 13, each of which is supported from the central hollow shaft 14. Means are provided whereby each of the segments 13 is radially adjustable with respect to the shaft 14 in order that the outer diameter of the mandrel 10 may be varied as desired.

Each of the arcuate segments 13 extends for the full length of the mandrel and each carries a copper contact piece 15 mounted on a sponge rubber pad 16. A metallic segment 17 forms a recess 18 for reception of the rubber pad 16 and copper contact 15. A surface layer 19 of electrically non-conducting material overlies the metallic segment 17 on each side of the copper contact 15 and is secured to the metallic segment 17 by machine screws (not shown). Secured to the underside of each metallic segment 17 is a stiffener 17a and a pair of tubular supports 20. These are carried by a cross web 21 secured on an adjustment bar 22 by means of the channels 23. These channels 23 extend substantially the full length of the mandrel. The adjustment bar 22 is received at its terminal ends in slots 9 formed in the cam members 24.

A central screw 25 extends through the hollow shaft 14 and is provided with right hand and left hand threads 27 and 28. The construction is such that rotation of the control screw 25 by the crossbar 8 serves to move the follower elements 29 and the cam pieces 24 axially of the mandrel 10 and thereby move the adjustment bars 22 and channels 23 radially of the hollow shaft 14. The constructional features just described are not the subject of the claims in the present application, but are described in detail in order that a clear understanding may be obtained of the particular construction utilized for moving the mandrel segments 13 radially of the central shaft 14.

Power means are provided for rotating the mandrel 10 and, as shown in the drawings, this means may include the geared motor 30 mounted on the pedestal 31, which is, in turn, supported by the base frame 32. The base frame 32 carries the bearing supports for the bearings 11, 12 and 33. The geared motor 30 is provided with a power take-off gear 34 adapted to rotate the main driving gear 35 secured upon the power shaft 36. The central shaft 14 of the mandrel 10 is connected to the power shaft 36 by means of the detachable drive coupling 37.

A means is provided for spooling one or more wires around the mandrel 10, and as shown in Figure 1 this means includes a pair of wire straighteners and tensioners 38 and 39. Each of these devices 38 and 39 carries a plurality of rollers 40, which are arranged to straighten a wire as it is unreeled from a spool (not shown). The construction of these wire feeding devices 38 and 39 constitutes no part of the subject invention, but is merely illustrative of a common form of wire feeding devices now in use. The assemblies 38 and 39 are supported upon a frame 41, which is carried upon tracks 42 extending parallel to the axis of the mandrel 10. Wheels 43 are carried in the frame 41 and roll on the tracks 42 so the wire feeding devices 38 and 39 may be positioned opposite any point along the length of the mandrel 10. An endless chain is attached to the frame 41 and is driven from a source of power (not shown) for rolling the frame 41 along the tracks 42 at a selected rate, but electrically synchronized with the mandrel 10 to impart a definite pitch to the helix formed on the mandrel 10.

On one side of the mandrel 10, opposite the location of the wire feeding devices 38 and 39, is mounted a resistance welding unit generally designated 45. This resistance welding unit 45 comprises a welding machine 46, including the usual current transformer and control means for the welding circuit. The unit 45 is supported on a frame 47 and mounted for longitudinal rolling movement along the rails 48 and 49. Upper and lower rollers 50 are provided on the frame 47 for rolling contact with the rails 48 and 49 and side rollers 51a are also carried by the frame 47 for maintaining alignment of the frame 47 with respect to the rails 48 and 49. The construction is such that the resistance welding unit 45 is mounted for movement parallel to the axis of the mandrel 10 in a manner similar to that of the wire feeding devices 38 and 39. The frame 47 supports cross head 51 upon which is mounted a pair of spaced welding rollers 52 and 53. These rollers form a part of the transformer secondary circuit and serve to carry the welding current. Insulated electrical leads (not shown) are provided for the rollers 52 and 53. The cross head 51 is urged in the direction toward the mandrel 10 by means of the air cylinders 54 and 55, which are carried on frame 47.

In the operation of this device, a plurality of rods 56 is positioned around the circumference of the mandrel 10 and one or more wires from the wire feeding units 38 and 39 are wound around the periphery of the mandrel 10 as it is rotated by the gear motor 30.

After the longitudinal rods 56 have been secured in position on the contact pieces 15 carried by the mandrel segments 13, one or more wires 63, 64 are wound around the mandrel 10 from the wire feeding devices 38 and 39. The continuous wires 63 and 64 are secured at a starting position by means not shown and are wound helically around the mandrel 10 by rotation of the mandrel 10 on its axis. The wire feeding means 38 and 39 are adjusted to supply the correct tension for the wires 63 and 64. As shown in the drawings, roller 52 of the resistance welding unit is adapted to contact wire 63 and roller 53 contacts wire 64, and the rollers are supported in a position about 90° around the mandrel from the point where the wires first engage the mandrel surface. The roller position need not be at 90° from such point, but may be placed at any convenient location. The roller 52 is provided with a groove 65, which fits the contour of the continuous wire 63, and is held in contact with the wire by the air cylinders 54 and 55. Since the wire feeding deivces 38 and 39 are moved parallel to the axis of the mandrel while the mandrel is rotating, the continuous wires 63 and 64 are wound helically on the mandrel. The roller 52 having the groove 65 acts as a drive means to progress tthe resistance welding unit along its supporting rails 48 and 49, assisted by a variable speed air motor 72. The air motor 72 receives air from a supply line 73 by way of a control valve 74 and a reservoir 75. A pinion gear 76 driven by the air motor 72 is adapted to engage a rack 77 fixed along the side of the stationary support for the rails 48. In the operation of the device the valve 74 is adjusted so that the air pressure at the air motor 72 is insufficient to cause the air motor to move the welding carriage 47 along the rails 48. The action of the air motor 72 is to assist in the translation of the carriage 47 in order to prevent undue wear on the grooved roller 52.

I have found that satisfactory welds can be made while rotating the mandrel 10 at surface speeds as high as 150 feet per minute. While the mandrel 10 is rotating and when the rollers 52 and 53 reach a preselected point in advance of one of the longitudinal rods 56, one of the initiating elements 66 mounted on the drive element 37 is brought into contact with the micro-switch 67, supported on the bearing support 68. This micro-switch 67 closes an initiating circuit in the control mechanism for the welder 46 in a manner well understood in the art. The welder then causes a high amperage welding current to flow in the secondary lead 73 shown diagrammatically in Figure 6. The welding current flows only for about 12 cycles (using 60 cycle alternating current supply) and is timed to cut off just as the welding rollers 52 and 53 reach a position directly over the longitudinal rod 56.

This welding current flows from one roller to the other serially through the joints between the wires 63 and 64 and the longitudinal rod 56. This welding current passes, for example, from the roller 52 to the wire 63, to the rod 56, and into the copper contact piece 15. The current then flows from the contact piece 15 back into the rod 56 to the wire 64 and back to the roller 53. Since pressure is maintained on the roller by air cylinders 54 and 55, the passage of the welding current serves to resistance weld the wires 63 and 64 to the longitudinal rod 56. Both of these welds are made simultaneously. Each time that wires 63 and 64 cross over one of the longitudinal rods 56, the cross-over joints so formed are automatically resistance welded by the rollers 52 and 53 as the mandrel continuously rotates. There are as many initiating elements 66 provided as there are longitudinal rods 56.

When the continuous wires 63 and 64 have completely traversed the mandrel from end to end, the rotation of the mandrel 10 and the translation of the frame 41 are arrested. The continuous wires 63 and 64 are then severed adjacent the last resistance weld which was made. The mandrel 10 is then collapsed radially by turning the control bar 8 and hence simultaneously moving each of the segments 13 radially inwardly. The longitudinal rods remain secured to the helically wound wires 63 and 64 in the form of a completed cage, while the copper contacts 15 are thus moved radially inwardly out of engagement with the longitudinal rods 56. The completed wire cage is removed from the mandrel after the coupling unit 37 has been disengaged and to permit disconnection of the supporting bearing 12 from the post 69. The completed cage is then removed axially from the mandrel.

Figure 2:
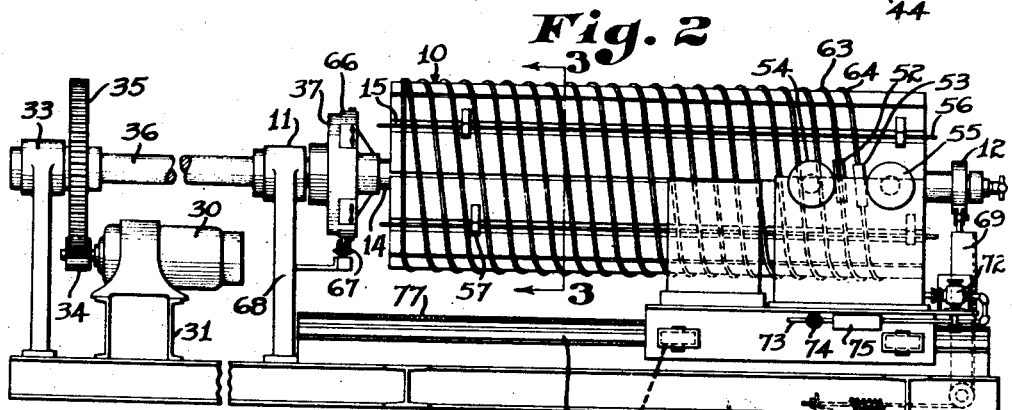
Figure 2 is a side elevation thereof.
Figure 3:
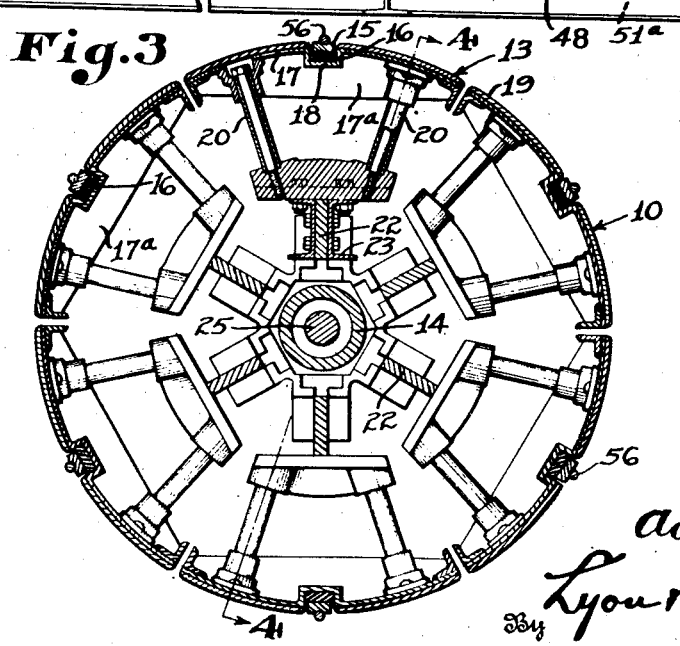
Figure 3 is a sectional view taken substantially on the line 3—3 of Figure 2.
Figure 4:
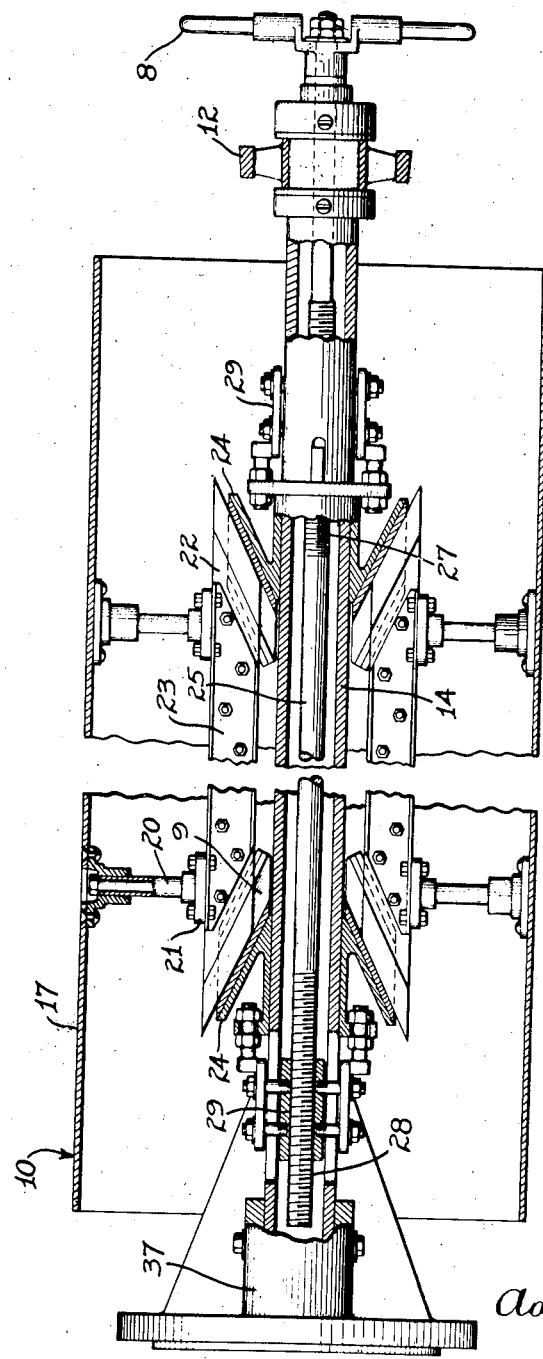
Figure 4 is a partial longitudinal sectional view of the mandrel, taken substantially on the line 4—4 as shown in Figure 3.

In that form of my invention shown in Figures 5 and 6, one or more wires 63, 64 are first wrapped helically upon the mandrel 10. The longitudinal rods 56 are then welded in place on the outside of the helical wires 63, 64 instead of underneath them as described above. The resistance welding unit 45 is the same as that described above except that the roller 53 is removed and in its place is substituted a roller 74. The individual welding heads 51 are turned approximately 90° from the position illustrated in Figures 1 and 2. The roller 74 is mounted for rotation on a shaft 75 secured between horizontal plates 76 and 77. These plates in turn are secured to a bar 78 by means of bolt connections 79. The bar 78 extends parallel to the mandrel axis from the support 80 that is fixed relative thereto by clamping means 81. The proportions of the parts are such that the roller 74 rides above the roller 52 somewhat closer to the axis of the mandrel 10. In this arrangement the rollers are insulated relative to each other and are individually carried for dependent actuation by the air cylinders 54, 55.

The micro-switch 82 is secured to the plate 77 and carries an actuating arm 83 adapted to contact the helical wires 63, 64. In the operation of this device the welding unit 45 is caused to travel along the rails 48 by means of the air motor 72. The roller 52 contacts a longitudinal rod 56 to be welded at the intersections of each of the helical wires 63, 64. As the roller 52 is traversed along the rod 56, the arm 83 of the microswitch 82 strikes each successive wire 63, 64 in advance of the intersection of the rod 56 with the helical wire. At the instant that the microswitch 82 is tripped by the arm 83, the roller 74 is in contact with the helical wire 63. The microswitch initiates the usual timing control (not shown), which in turn passes a welding current through the roller 74 to the helical wire 63, back through the intersection of the wire 63 with the rod 56 and into the grooved roller 52. The timing is such that the arm 83 on the micro-switch 82 initiates the welding current before the grooved roller 52 is directly over the intersection to be welded. The welding current is initiated while the grooved roller 52 approaches the intersection and this current is cut off when the roller 52 lies directly over the joint to be welded. The action of the air motor 72 in progressing the welding unit 45 along the rails is important in this welding operation. The valve 74 is adjusted so that the air motor 72 has sufficient power to move the carriage along the rails 48. The motion is not uniform, however, but consists of a series of accelerations and decelerations as the roller 52 on the rod 56 rides over the helical wires 63, 64. Each time that the roller 52 approaches one of the helical wires 63, 64 the increased resistance due to the roller 52 climbing over wire 63 against pressure from air ram 54 partially stalls the air motor and hence slows down the travel of the carriage. When the air pressure in the reservoir 75 reaches a sufficient intensity, the air motor develops sufficient power to move the roller 52 across one of the helical wires. It will be observed that this non-uniform motion for progressing the roller 52 along the rod 56 is particularly advantageous since in effect it slows down the motion of the roller 52 during the welding cycle and speeds up the motion between welds and thereby decreases the required over-all welding time.

Having fully described my invention, it is to be understood that I do not wish to be limited to the details herein set forth, but my invention is of the full scope of the appended claims.

I claim:

1. In a device for making a wire cage, the combination of a rotatable mandrel; means for winding a continuous wire around the mandrel in the form of a helix; means for securing a longitudinal rod to the loops of the helix exteriorly thereof, said means including a resistance welding unit adapted for axial movement along said mandrel, said welding unit including a contact roller adapted to roll along the longitudinal rod and a circular contact element adapted to sequentially engage loops of the helix; and means for passing a welding current between the contact roller and the contact element for resistance welding the rod to the loops of the wire helix; and drive means for traversing the welding unit relative to said mandrel with non-uniform motion having alternating acceleration and deceleration periods, occasioned by variable resistance to translation imposed by the contact roller as it approaches and departs from the helix loops.

2. In a device for making a wire cage, the combination of a rotatable mandrel; means for winding a continuous wire around the mandrel in the form of a helix; means for securing a plurality of parallel longitudinal rods to the loops of the helix exteriorly thereof, said means including a resistance welding unit adapted for translation along said mandrel, said welding unit having a roller electrode adapted to roll along a longitudinal rod and a contact electrode adapted to sequentially engage loops of the helix, the resistance welding unit including means for passing a welding current between the electrodes for resistance welding the rod to the loops of the wire helix; and drive means including an air motor for traversing the welding unit relative to the mandrel in a series of alternating acceleration and deceleration periods occasioned by variable resistance to translation imposed by the roller as it approaches and departs from the helix loops.

3. In a device for making a wire cage, the combination of a rotatable mandrel; means for winding a continuous wire around the mandrel in the form of a helix; means for securing a plurality of parallel longitudinal rods to the loops of the helix exteriorly thereof, said means including a resistance welding unit adapted for translation along said mandrel, said welding unit having a roller electrode adapted to roll along a longitudinal rod and a circular contact electrode adapted to sequentially engage individual loops of the helix, the resistance welding unit including means for passing a welding current between the electrodes for resistance welding the rod to the loops of the wire helix, said means including switch means successively operable by the helix loops for energizing the electrodes intermittently on a relatively low duty cycle; and drive means for traversing the welding unit relative to the mandrel.

4. In a device for making a wire cage, the combination of a rotatable mandrel; means for winding a continuous wire around the mandrel in the form of a helix; means for securing a plurality of parallel longitudinal rods to the loops of the helix exteriorly thereof, said means including a resistance welding unit adapted for translation along said mandrel, said welding unit having a roller electrode adapted to roll along a longitudinal rod and a contact electrode adapted to sequentially engage loops of the helix; means resiliently maintaining pressure contact between the roller electrode and said rod to deflect the rod at locations between helix loops, the resistance welding unit including means for passing a welding current between the electrodes for resistance welding the rod to the loops of the wire helix, said means including switch means successively operable by the helix loops for energizing the electrodes intermittently on a relatively low duty cycle; and drive means including an air motor for traversing the welding unit relative to the mandrel in a series of alternating acceleration and deceleration periods occasioned by variable resistance to translation imposed by the roller electrode as it approaches and departs from the helix loops.

5. The method of making a wire cage, comprising the steps of winding a continuous wire around a mandrel in the form of a helix by continuously traversing a resistance welding device along the longitudinal rod to weld it to the loops of the helix, the traversing motion being non-uniform so that the rate of movement of the welding device is slower at points of cross-over of the rod and helix loops than at intermediate points along the rod.

ADOLF G. BUTLER.

REFERENCES CITED

The following references are of record in the file of this patent:

UNITED STATES PATENTS

| Number | Name | Date |
|---|---|---|
| 1,878,760 | Cosgrave et al. | Sept. 20, 1932 |
| 2,040,349 | Wagner | May 12, 1936 |

FOREIGN PATENTS

| Number | Country | Date |
|---|---|---|
| 1,139 | Australia | Mar. 12, 1931 |